June 27, 1933.　　A. G. GUTIERREZ　　1,915,886
SELF PROPELLED VEHICLE
Filed Jan. 7, 1932　　2 Sheets-Sheet 1
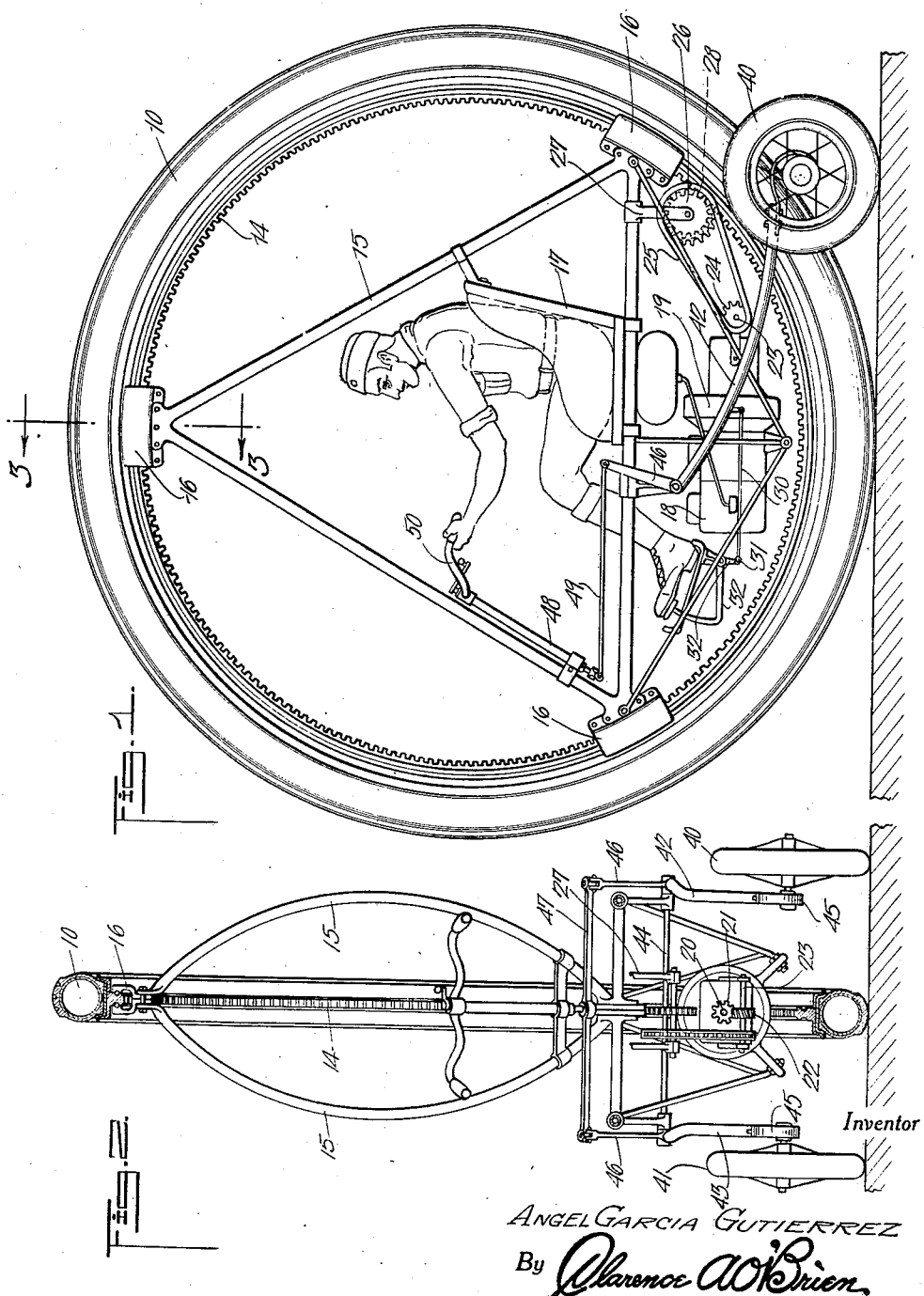
Inventor
ANGEL GARCIA GUTIERREZ
By Clarence A O'Brien
Attorney June 27, 1933.  A. G. GUTIERREZ  1,915,886
SELF PROPELLED VEHICLE
Filed Jan. 7, 1932  2 Sheets-Sheet 2
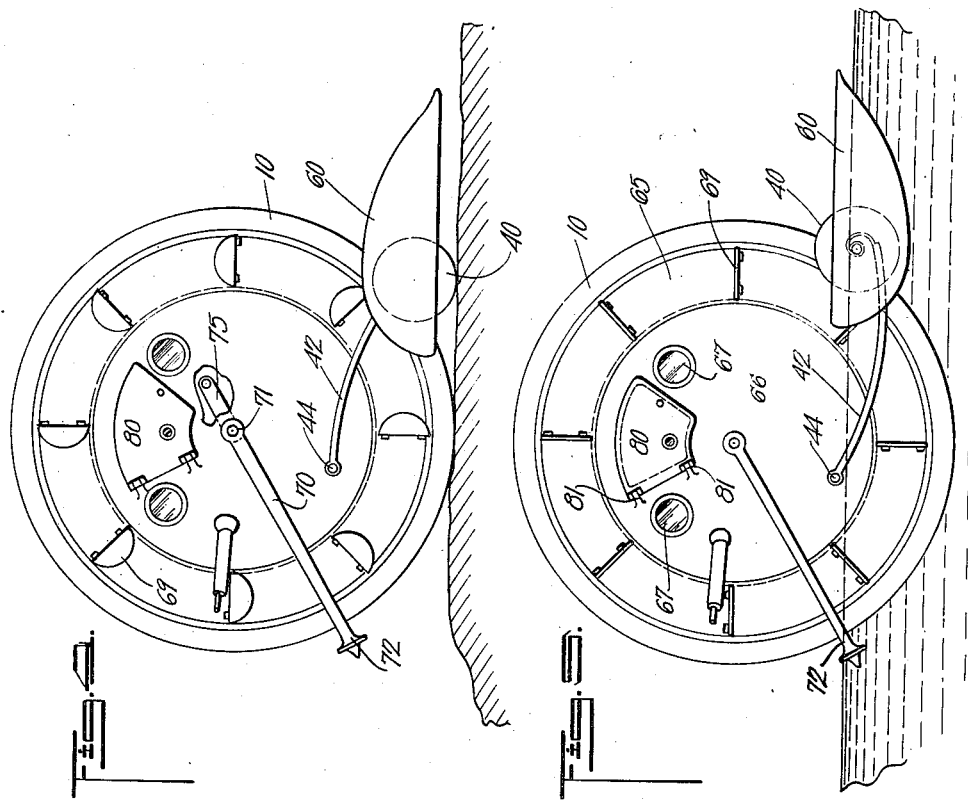
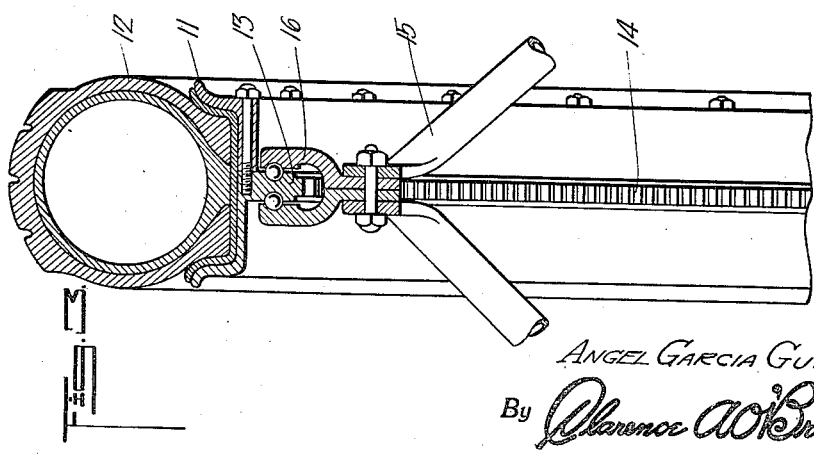
Inventor
ANGEL GARCIA GUTIERREZ.
By Clarence A. O'Brien
Attorney Patented June 27, 1933

1,915,886

UNITED STATES PATENT OFFICE

ANGEL GARCIA GUTIERREZ, OF TARRYTOWN, NEW YORK

SELF-PROPELLED VEHICLE

Application filed January 7, 1932. Serial No. 585,308.

The present invention relates to new and useful improvements in vehicles, and more particularly it pertains to a self propelled vehicle of the unicycle type.

It is one of the primary objects of the present invention to provide a vehicle of the unicycle type which is particularly adapted for use as a fighting vehicle of the type commonly known as tanks.

It is a further object of the invention so to construct such a vehicle that it is capable of use either on land or as a water vehicle.

A still further object of the invention resides in a novel construction and arrangement of parts whereby the vehicle may be driven by a motor such for example as an internal combustion motor, electric motor or a motor of any other desired type.

A still further object of the invention resides in a new and novel mechanism whereby a vehicle of the unicycle type may be effectively steered while the same is travelling even at high speed.

A still further object of the invention resides in a new and novel mechanism whereby the entire vehicle may be supported by a pair of levers which extend preferably beyond the periphery of the driving and supporting wheel and by means of which the device may be aided in surmounting obstructions either in the form of depressions or the like.

With the above and other objects in view, reference will be had to the accompanying drawings, in which:

Figure 1 is a view in side elevation of a vehicle constructed in accordance with one form of the present invention, Figure 2 is a vertical sectional view thereof, Figure 3 is a detail vertical sectional view taken on the line 3—3 of Figure 1, Figure 4 is a view in side elevation on a reduced scale showing a modified form of the invention, and Figure 5 is a view similar to Figure 4 showing the manner in which the vehicle may be used as a water vehicle instead of a land vehicle.

Referring more particularly to the drawings, the device comprises a supporting and driving wheel member 10. As best illustrated in Figure 3, this wheel member comprises a rim 11 which carries a pneumatic tire 12. The rim 11 is provided with an inwardly disposed annular flange 13 and this flange is formed upon its inner edge with a plurality of teeth 14. This construction provides a continuous internal gear the purpose of which will be hereinafter more specifically described.

Mounted within this supporting and driving wheel, there is a frame 15 which is of general triangular form and this frame is provided at its corners with guide members 16 which embrace the inwardly disposed flange 13 of the rim 11 as best illustrated in Figure 3. The frame consists of two triangular members which are slightly bowed as illustrated in Figure 2 and this frame is adapted to support a driver's seat or the like 17. The frame 15 carries a driving motor 18 which is provided with a clutch or the like 19 and which has a shaft 20 provided with a gear 21 which meshes with a gear 22 carried by a shaft 23. The shaft 23 carries a sprocket 24 and passing around this sprocket 24 there is a driving chain 25. This driving chain 25 passes around a sprocket 26 carried by a frame 27 which in turn is attached to the frame 15 and having driving connection with the sprocket 26, there is a gear 28 which meshes with the internal gear 14.

Thus as the motor 18 operates, the sprocket 24 will drive the chain 25 and the sprocket 26 and through the medium of the gear 28 meshing with the gear 14, the supporting and driving wheel 10 will be driven assuming of course that the clutch is connected. The driving and supporting wheel 10 travels around the frame 15 which latter maintains the position in which it is illustrated in Figure 1 due to the amount of weight supported from the lower portion thereof.

A suitable brake mechanism not herein illustrated is provided and this brake mechanism consists of a brake which will automatically operate upon the driving mechanism when the clutch is disconnected. The clutch is operated by means of a rod or the like 30 connected as at 31 to the arm 32 of a foot operated lever 33, and when this lever is depressed, the clutch will be thrown out of engagement and upon further depression thereof the brake heretofore mentioned will be operated. Any conventional type of brake may be employed and therefore, the specific type of brake has not herein been illustrated.

Means is provided to steer the vehicle and to provide stabilization therefor. In the present embodiment of the invention, this means consists of two steering and stabilizing wheels 40 and 41. These wheels are carried by levers 42 and 43 respectively and the levers are mounted upon the end of a transversely extending rod 44. The wheels 40 and 41 are connected to their respective levers by means of springs or the like 45 and these springs serve a purpose to be hereinafter specifically described. Connected to each of the levers 42 and 43 there is an arm 46 and connecting these arms there is a cross rod 47 which is mounted upon a steering member 48. The connection between each arm 46 and the cross arm 47 consists of a rod or the like 49 and this connection is of such construction that as the steering column 48 is turned, the wheels 40 and 41 may be placed under varying pressure dependent upon the direction of movement of the steering column 48. Handle bars or similar devices 50 are employed for turning the steering column 48.

When it is desired to steer the vehicle to the right for example, the handle bars 50 will be turned to the right turning the steering column to the right. This will rock the lever 43 and place the spring 45 under increased tension and thus subjects the wheel 41 to increased pressure and will cause the vehicle to turn to the right. The reverse operation will steer the vehicle to the left.

As illustrated in Figures 4 and 5, the stabilizing wheels may be mounted in a housing or the like 60 and the levers by which they are carried may be reversible in order that the housings 60 may provide water shoes or the like when the device is used as a water vehicle as illustrated in Figure 5 and the steering of the vehicle may be accomplished in the same manner as heretofore described when the device is used as a land vehicle.

As illustrated in Figures 4 and 5, a suitable housing consisting of side ring members 65 and center plates 66 are employed to enclose the entire mechanism and the driver, and suitable observation windows such as 67 may be employed for the purpose of determining the direction of travel of the vehicle. The ring like members 65 may be provided with feathering vanes 69 by means of which the device is propelled as the ring like members 65 are rotated it being understood that these ring like members will be carried by the rim 11, and will move relative to the plates 66 which do not rotate.

Means is provided to elevate the supporting and driving wheel out of contact with the supporting surface. This means is adapted to elevate the device so that it may be carried over obstructions such as ditches, trenches or the like and it consists of a plurality of levers 70 pivotally mounted as at 71 to the axis of the supporting and driving wheel. These levers extend beyond the periphery of the supporting and driving wheel as indicated by the reference character 72 and are normally carried in the position in which they are shown in Figure 4.

When it is desired to use these devices, it is only necessary to operate the means 75 to lower them into engagement with the supporting surface and upon continuous driving of the supporting and driving wheel, they will engage the surface and due to the momentum of the vehicle, will elevate the supporting and driving wheel out of engagement with the driving surface and swing the vehicle forward until such times as the members 70 have passed to the rear of the vertical axis of the device after which the supporting and driving wheel will be lowered into engagement with the supporting surface.

In that form of the invention illustrated in Figures 4 and 5, a suitable door 80 is employed by means of which access to the interior of the vehicle may be had and this door is preferably of the hinged type mounted upon hinges 81.

From the foregoing, it will readily be apparent that the present invention provides a new and novel form of vehicle which particularly lends itself for use as a fighting vehicle such as a tank, and which is adapted for use either as a land vehicle or as a water vehicle.

While the invention has been herein illustrated in what may be termed a preferred form, it is to be understood that the invention is not to be limited to the specific construction herein shown, but that it may be carried out in other forms without departing from the spirit thereof.

Having thus described the invention, what is claimed as new, and what it is desired to secure by Letters Patent of the United States, is:

A vehicle of the class described comprising a substantially triangular-shaped frame vertically arranged, channel shaped members at the ends of said frame, a wheel having an inwardly extending annular flange thereon passing through the channel members, anti-friction means in the channel members engaging the flange, said flange having teeth on its inner edge, a gear supported by the frame and engaging the teeth, means supported by the frame for rotating the gear, a pair of levers each pivotally supported at one end in the frame, a spring connected to the other end of each lever, a small wheel supported by each spring, one lever and its wheel being located at one side of the frame and the main wheel and the other lever and its wheel at the opposite side, a steering post supported for rocking movement in the frame, a cross bar at the lower end of the post, a link connected to each end of said cross bar, an arm extending upwardly from the pivoted end of each lever with the upper end of each arm connected to a link whereby movement of the steering post in one direction will move one lever downwardly for tensioning the spring and apply pressure to the wheel attached to the spring while the other lever will be raised and movement in the opposite direction of the steering column will depress the second lever and raise the first lever.

In testimony whereof I affix my signature.

ANGEL GARCIA GUTIERREZ.